Dec. 23, 1924.
M. M. BERG
ANIMAL TRAP
Filed May 3, 1923
1,520,557
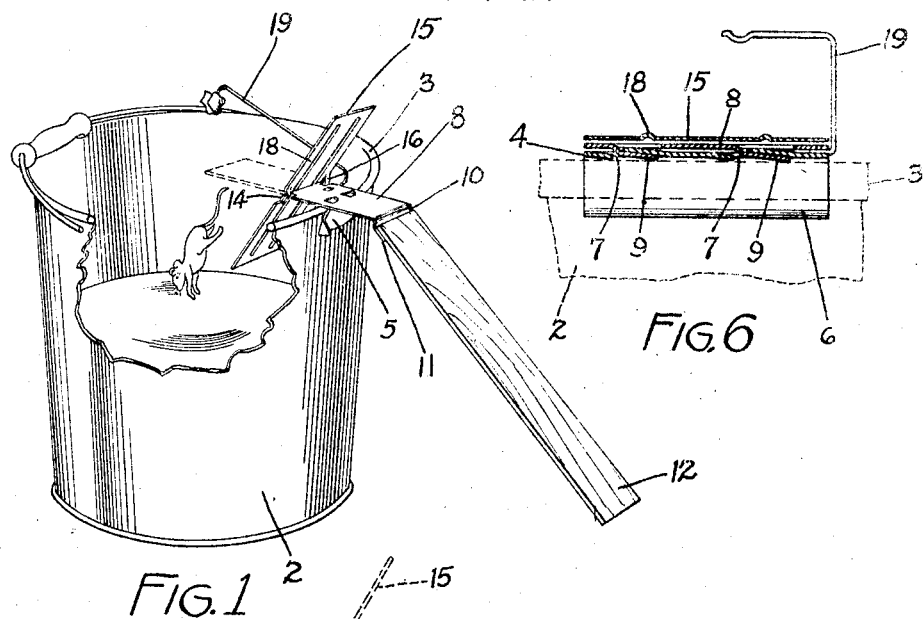
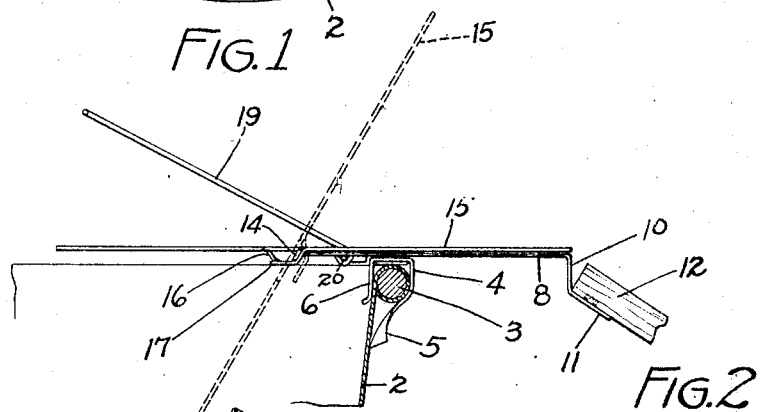
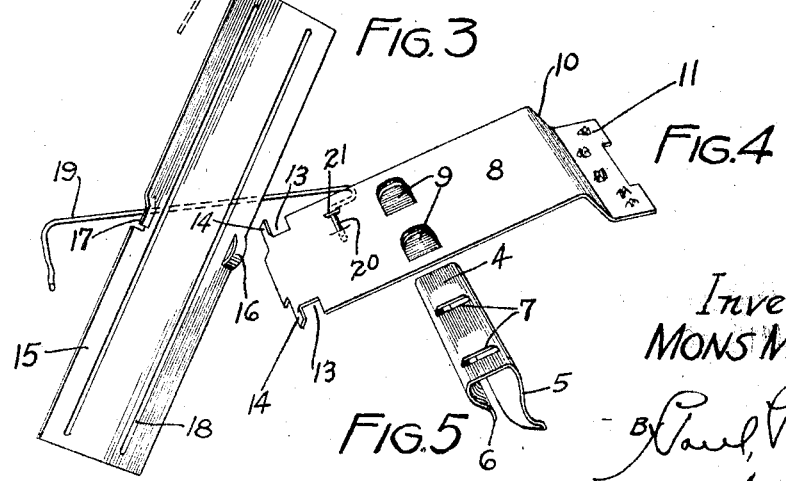
Inventor
MONS M. BERG
By Paul, Paul & Moore
ATTORNEYS Patented Dec. 23, 1924.

1,520,557

UNITED STATES PATENT OFFICE.

MONS M. BERG, OF DULUTH, MINNESOTA.

ANIMAL TRAP.

Application filed May 3, 1923. Serial No. 636,411.

*To all whom it may concern:*

Be it known that I, MONS M. BERG, a citizen of the United States, resident of Duluth, St. Louis County, State of Minnesota, have invented certain new and useful Improvements in Animal Traps, of which the following is a specification.

The object of my invention is to provide a trap for catching mice, rats, and the like, and a trap that will be self-setting, or so constructed that it will return to its normal position after being sprung by the entrance of the animal therein.

A further and particular object is to provide a trap composed of parts stamped or pressed from sheet metal and hence of very inexpensive construction and comparatively small selling price.

The invention consists generally in various constructions and combinations all as hereinafter described and particularly pointed out in the claims.

In the accompanying drawings forming part of this specification,

Figure 1 is a perspective view of my improved trap applied to a suitable receptacle such as an ordinary house pail;

Figure 2 is a sectional view of a portion of the wall of the pail showing the manner of mounting the device thereon;

Figures 3, 4, and 5 are perspective views of the elements of the trap in position to be assembled;

Figure 6 is a sectional view through the clip device by means of which the trap is mounted on the receptacle.

In the drawings:

2 represents a suitable open top receptacle preferably the ordinary house pail adapted to contain a quantity of water. This pail has the usual bead 3 around the upper edge of its walls. 4 is a clip formed preferably from one piece of sheet metal having flanges 5 and 6 which are pressed apart to allow the insertion of the bead 3 between them; the outer wall of the bead bearing on the inner face of the flange 5 and guiding the clip to its seat on the bead.

The upper portion of this clip has transverse slots 7 therein and a plate 8 also formed of sheet metal has tongues 9 on the under side thereof to enter the slot 7 and hold the plate firmly on the clip. The outer end of the plate has a downwardly turned portion 10 terminating in a flat section 11 whereto a suitable inclined runway 12 is attached by suitable means, such as prongs pressed up out of said flat section. This inclined runway serves as a means for the animal approaching the trap to reach the plate 8 on the top of the receptacle.

The inner end of the plate projects into the receptacle and has notches 13 on each side thereof forming lugs 14 which are preferably pressed out of the metal composing the plate when it is formed. 15 is a tilting platform also pressed from sheet metal and having formed near the center thereof on its opposite edges, an eye 16 and a lug 17, both the loop forming the eye and the lug being pressed out of the sheet metal in the act of stamping the plate. The lugs 14 are tilted down slightly, and one lug is adapted to enter the eye 16 while the other lug engages with the lug 17; the end of the plate 8 forming a pivotal support for the tilting platform. The platform is made of comparatively thin sheet metal, and I prefer to provide longitudinal ribs 18 therein for stiffening purposes. When the platform is mounted on the plate 8 it normally will lie by gravity in a horizontal position as indicated in Figure 2. When, however, an animal such as a mouse or rat walks onto this tilting platform, it will immediately assume the position indicated by dotted lines in Figure 2 and precipitate the animal into the receptacle beneath.

The bait for the trap is preferably mounted upon a wire rod 19 having an angular end portion 20 that is inserted into a socket 21 formed in the plate 8 adjacent its inner end; the rod projecting inwardly over the receptacle and adapted to support a piece of cheese or other food which will attract the animal to be captured. Whenever an animal has walked on the tilting platform and been precipitated into the water beneath, the platform will immediately return to its normal horizontal position and therefore become self-setting ready to repeat its operation.

It will be noted that this device is pressed or stamped from sheet metal and when the necessary dies or tools have been made, the manufacturing cost may be reduced to a minimum. Furthermore, the trap made in this way can be sold in knock-down form and assembled easily and quickly by the user. This knock-down construction effects, therefore, considerable saving in space required for a stock of the traps and also permits it to be mailed or otherwise shipped in a small compact package.

I claim as my invention:

1. An animal trap comprising a clip member adapted to be mounted on the upper wall of a receptacle, a fixed sheet metal plate member having a tongue and slot connection with said clip, a tilting platform having means for pivotal connection with said plate to normally rest by gravity thereon with its inner end overhanging the receptacle but adapted to tilt under the weight of the animal thereon, and a bait-support mounted at one end on said fixed plate and having its other end overhanging the receptacle adjacent the inner end of said tilting platform.

2. An animal trap comprising a clip pressed from sheet metal and having flanges for grasping the walls of an open top receptacle, said clip having slots therein, a plate also pressed from sheet metal having tongues formed therein to enter the slots in said clip, one end of said plate having means for connecting a runway thereto, a tilting platform also pressed from sheet metal and pivotally connected at its middle portion with the inner end of said plate, and a bait-supporting means mounted on said plate.

3. An animal trap comprising a fixed sheet metal plate having means for mounting it on an open top receptacle, and having lugs pressed out of its inner end, a tilting sheet metal platform having a loop and a lug pressed out near its middle portion to interlock with the lugs on said plate, and a bait-supporting means mounted on said plate.

4. An animal trap comprising a clip adapted to clasp the upper edge of the wall of an open top receptacle, a plate having means for fixed engagement with said clip, a tilting platform having means for pivotal engagement with one end of said plate, said clip, plate, and platform being all pressed from sheet metal and their engaging means being formed therein during the pressing operation.

5. An animal trap comprising a clip pressed from sheet metal and having means for grasping the walls of an open top receptacle, a plate also pressed from sheet metal and adapted to rest on the top of said clip, said clip and plate having interlocking tongues and slots engaged by relative lateral movement, a tilting platform also pressed from sheet metal and pivotally connected at its middle portion with the inner end of said plate and a bait-supporting means mounted on said plate.

In witness whereof, I have hereunto set my hand this 27th day of April 1923.

MONS M. BERG.